Dec. 17, 1935.  A. L. BERGER  2,024,202
REGULATOR
Filed April 3, 1930
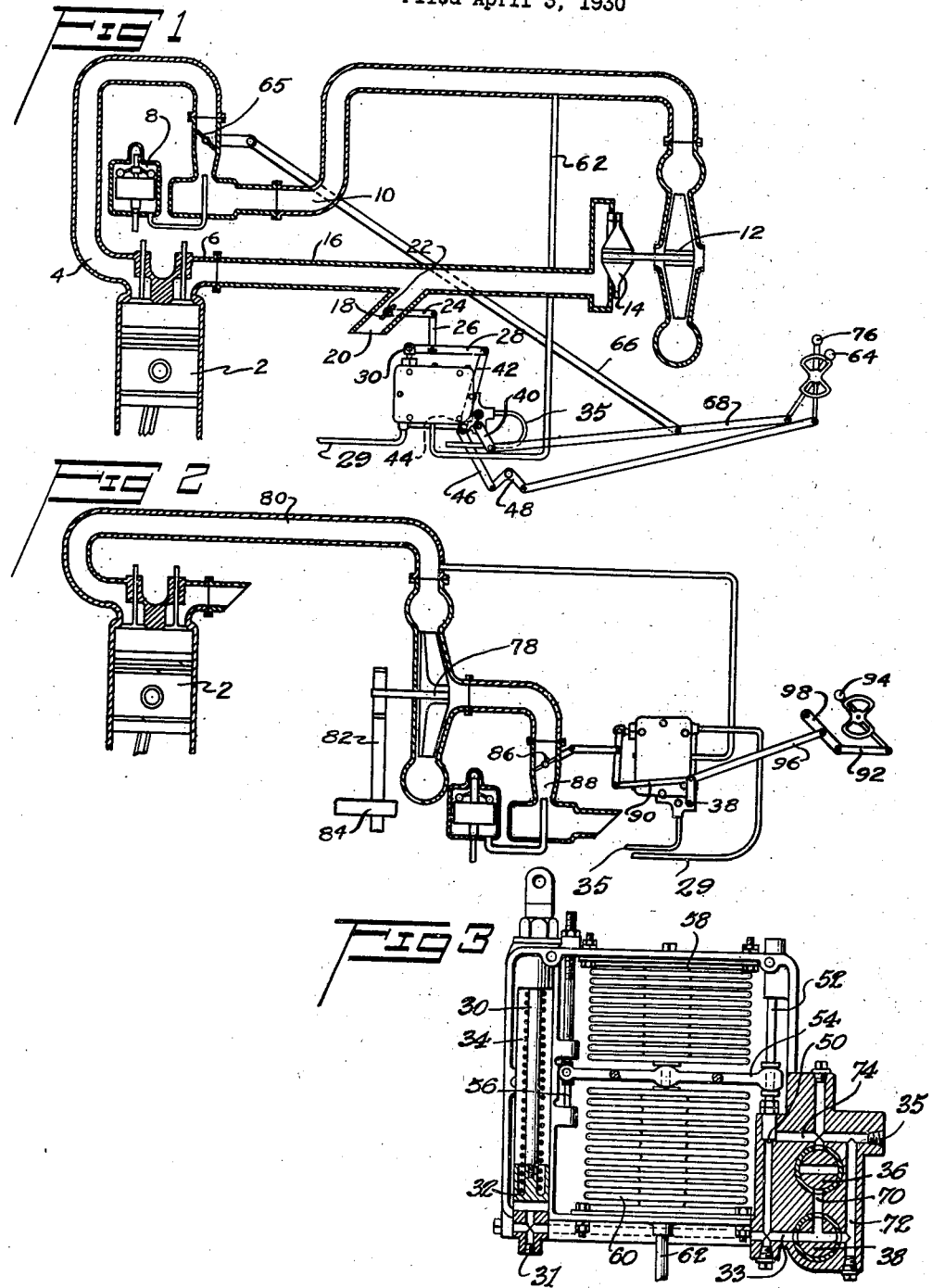
INVENTOR
Adolph L. Berger.
BY
Robert H. Greene
ATTORNEY Patented Dec. 17, 1935

2,024,202

UNITED STATES PATENT OFFICE 2,024,202

REGULATOR

Adolph L. Berger, Dayton, Ohio

Application April 3, 1930, Serial No. 441,351

15 Claims. (Cl. 123—119)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to superchargers for internal combustion engines and more particularly to improvements in control mechanism for controlling the supercharger.

My invention has for an object to provide an improved regulating or control mechanism by which a supercharger may be fully automatically controlled, semi-automatically controlled, or fully manually controlled.

A further object of my invention is to provide in a device of this character, including a fluid pressure responsive element of predetermined pressure, means for adjusting the fluid pressure within said element.

Another object of my invention is to provide in a supercharger regulator having a variable pressure responsive element and a pressure responsive element of predetermined degree an hydraulic servomotor and valve means responsive to the simultaneous movements of said variable and fixed pressure responsive elements.

Still another object of my invention is to provide in a supercharger regulator means for adjusting said regulator to limit the supercharging to a predetermined pressure, irrespective of the atmospheric pressure.

It is well known that air at sea level or other desired pressures may be supplied to internal combustion engines by means of a supercharger to the engine. When the supercharger is used in connection with the suction type system, in which the carburetor is located at the inlet to the supercharger, it is desirable to employ manual control of the supercharger for a partial throttle control of the carburetor and to automatically control the carburetor throttle beyond the manual control.

This manual control is designed to permit the effecting of pressures by the supercharger up to, but not exceeding, a predetermined pressure to which the supercharging is limited, the automatic control serving to limit the pressure effected by the supercharger to a predetermined degree.

When the supercharger is used in connection with a pressure type system, it is desirable that the regulation of the supercharger be entirely controlled automatically. However, it is advisable to provide means to permit the supercharger to be under the control of the operator and independent of the automatic control.

While the supercharger regulator and its principle of operation shown in the drawing and described in the specification are now considered to be the best embodiment of my invention, it is desired to have it understood that the device shown is only illustrative and that my invention may be carried out by other means.

Similar reference numbers were used to designate similar parts throughout the several views of the drawing, in which:

Fig. 1 is a diagrammatic elevational view of the pressure type system of supercharging in which the supercharger is driven by the exhaust gases of the internal combustion engine and in which the supercharger is fully automatically or fully manually controlled by a control mechanism embodying my invention.

Fig. 2 is a diagrammatic elevational view of the suction type system of supercharging in which the supercharger is driven by the engine crank shaft, the supercharger being controlled by my novel control mechanism that is provided with manual means to control the amount of supercharging up to, but not exceeding, a predetermined pressure, and thereafter with automatic means for controlling the same for limiting the predetermined pressure obtainable therefrom.

Fig. 3 is an open side view of a regulator assembly of the control mechanism showing certain parts in section.

In the present instance I shall describe my invention in connection with both the pressure and suction systems of supercharging of aircraft engines, it being understood that my invention may be carried out in connection with internal combustion engines used in connection with various types of vehicles as well as with any desired type of supercharger drive.

Referring now to Fig. 1 the schematic view is representative of the manner in which the cylinders of the engine are connected to the supercharger. The numeral 2 designates a cylinder of an airplane internal combustion engine of any suitable type for driving the propeller (not shown) of the airplane (not shown), 4 designates an intake pipe and 6 an exhaust pipe for such cylinder. The inlet pipe 4 is connected to a carburetor 8 to which air is supplied by a pipe 10 connected to the discharge side of the supercharger 12.

The supercharger is of a well known construction and functions to compress the air taken from the atmosphere and to deliver it through the pipe 10 to the carburetor. As shown diagrammatically in this view the supercharger is driven by a turbine wheel 14 actuated by the exhaust gases that are led thereto through the exhaust pipe 16. The manner of diverting the exhaust gases against the turbine is not being shown, as this is well known in the art and forms no part of my invention, it being understood that the supercharger and its driving means may be of any suitable structure.

In this instance the supercharger is regulated by a valve or blast gate 18 in the open end of the exhaust manifold 20 connected to the exhaust pipe 16. When the blast gate 18 is in the closed position all exhaust gases will be directed against the turbine; when the gate is in the open position the exhaust gases will be directed into the atmosphere; while when the blast gate is at intermediate positions of the open and closed positions it will be obvious that more or less exhaust gases will be supplied to the turbine.

The blast gate 18 may be fully automatically controlled by actuating a floating link by means of a hydraulic servomotor, or fully manually controlled by actuating said floating link manually.

Connected to the blast gate 18 is a crank arm 24, one end of which is fixed to the blast gate spindle 22 journaled in the wall of the exhaust manifold 20, the other end being pivoted to a link 26 that is connected intermediate of the ends of a floating link 28. The floating link has one end pivotally connected to a piston rod 30 which forms a part of the servomotor.

The other end of rod 30 is provided with a piston 32 that slides in a cylinder formed integral with the regulator casing. This piston is actuated by any suitable source of pressure supplied through pipe 29 to inlet 31 preferably from the engine oil supply, to which it is returned by pipe 35 connected to outlet 37. Outward movement of rod 30 compresses a spring 34 that is disposed between the end of the cylinder and the piston, the spring, of course, being of sufficient strength to return the piston when the oil pressure is released. Associated with piston 32 and cylinder through a conduit 33 are two valves, a two-way valve 36 and a three-way valve 38. Each of these valves is independently operated and as will be described hereinbelow cooperate with each other and with the piston 32 to obtain either a fully automatic or fully manual control of the blast gate. The three-way valve 38 together with its control lever rod 68 and crank arm 40, as well as the by-pass conduit, could if desired be dispensed with, but this arrangement is shown, since it is desirable to have a regulator that can readily be adapted to the fully automatic or the semi-automatic control of superchargers.

The two-way valve 36 is connected to the other end of the floating lever 28 by a link 42 to a valve crank arm 44, which is also connected to a control lever 76 in the cockpit of the airplane (not shown) by the link 46 and bell crank 48 that is suitably pivoted at its elbow to a fixed framework of the airplane fuselage.

Associated also with the piston and cylinder to provide a servomotor when the valves 36 and 38 are properly positioned is an automatically controlled valve 50, preferably of the needle type, that cooperates with the conduit 39 to control the exit of the fluid pressure through the discharge opening. This needle valve 50 is adjustably connected to a needle valve stem 52 that is connected at its intermediate portion by means of a swivel joint to one end of a floating lever 54, the outer ends of the needle valve and valve stem being suitably guided to permit the reciprocation thereof. The other end of the floating lever is pivotally connected to an adjusting rod 56, while at its mid portion the floating lever is connected by means of a swivel joint to the inner end portions of two pressure responsive elements 58 and 60 which as here shown are in the form of bellows type diaphragms. The outer end portions of the bellows type diaphrams are attached to the side walls of the regulator casing.

The interior of the diaphragm 60 is connected by a conduit 62 to the manifold 10 so that it is normally subject to the supercharger air pressure being delivered to the engine. Diaphragm 58 is sealed under vacuum or other predetermined pressure. It will readily be seen that if the pressure in the sealed diaphragm is not predetermined, or if it is desired to have the diaphragm 58 respond to sea-level atmospheric pressure or any other maximum pressure to which the supercharging of the engine is limited, the floating lever can readily be adjusted to obtain any desired pressure by adjusting the rod 56 to expand or contract the sealed diaphragm 58 to thereby decrease or increase the pressure effect thereof respectively.

The diaphragms 58 and 60 are similar in construction in order that for a given pressure they will respond equally, and so arranged that their pressure effects are opposed to each other. This arrangement is such that as long as the supercharger pressure does not exceed a predetermined pressure the diaphragm 58 will hold the needle valve 48 through the floating lever 54 in closed position. When, however, the supercharger pressure is greater than the predetermined pressure the diaphragm 60 will be expanded, moving the floating lever toward the left and the needle valve to open position.

The suction type system of supercharging, to which my invention is readily adaptable, is shown schematically in Fig. 2. Similarly to the pressure type system, the air is obtained from the atmosphere compressed by the supercharger 78 of well known construction and delivered to the cylinder 2 through the intake pipe 80. The supercharger is driven by the gearing 82 connected to the crank shaft 84 of the internal combustion engine and is located between the carburetor and the engine so that a mixture of gas and air is sucked through the carburetor and then compressed and delivered by the supercharger to the engine. In this instance the supercharger is regulated by the throttle valve 86 of the carburetor 88. The throttle valve 86 is normally in the closed position and very little if any charge of air and gas is sucked through the carburetor to be compressed. As the throttle valve is regulated from closed position to full open position the charge becomes greater and greater and the supercharger pressure is correspondingly increased.

The throttle valve 86 is controlled by a regulator the same as that above described and is connected thereto by a substantially similar link arrangement, but in a different manner. The floating link 90, instead of being connected to the crank arm of valve 36, is connected to the crank arm of valve 38, which in turn is connected to the throttle control 94 in the cockpit of the airplane (not shown) through rod 96, lever 98 pivoted to a fixed framework (not shown), and connecting link 92.

The operation of my invention as applied to the system of supercharging as shown in Fig. 1 is as follows:

Prior to leaving the ground the diaphragm 58 is adjusted to a predetermined pressure through the floating lever adjusting rod 56 and also the needle valve 50 is adjusted to be in closed position at that predetermined pressure. For full automatic operation the throttle 65 which is connected by means of a link 66 to the connecting rod 68, and the three-way valve 38 are set to full open and closed positions respectively by lever 64, while the valve 36 is permitted to remain in its normally closed position and the blast gate 18 is in full open position. With this arrangement the conduits 70 and 72 are shut off by the valves 36 and 38 respectively and temporarily prevent the escape of the fluid pressure which presses the piston against the spring 34 thereby forcing the rod upward and swinging one end of the floating lever 28 to partially or totally close the blast gate 18. The other end of the floating lever 28 is at this time acting as a fulcrum. The supercharger will now begin to operate and rapidly build up the supercharger pressure. As the pressure builds up in excess of the predetermined pressure, the diaphragm 60, which is in communication with the intake manifold, is caused to expand against the pressure in the sealed diaphragm 58 and thereby moving the floating lever 54 upwardly, and with it needle valve 50 to uncover the valve port 74, thus permitting the escape of the fluid pressure. The piston 32 is then returned by the spring 34 pulling the rod 30 and floating lever 28 downwardly and thereby opening the blast gate 18 to permit the escape of the exhaust gases to atmosphere and reduce the supercharger pressure. As the supercharger pressure is reduced below the predetermined pressure, the pressure in the sealed diaphragm 58 will be greater than in the diaphragm 60 and the needle valve 50 will automatically be returned to closed position. This cycle of operation continues and thus limits the supercharging to a predetermined pressure as long as the throttle 65 is in full open position and the valves 36 and 38 are in the said closed positions.

When, however, a full manual control is desired, the throttle 65 being still held in full open position, the operator by means of the control lever 76 turns the two-way valve 36 to open position, thus permitting the fluid pressure to bypass through the conduit 70 and render the servomotor inoperative. This movement of the control lever will simultaneously move the connecting link 42 counterclockwise, thereby causing the floating link 28 to swing about its pivoted connection with the piston rod, which connection at this time serves as a stationary fulcrum for the floating lever, to partially or totally close the blast gate which, of course, as heretofore stated, controls the supercharging.

Assuming that the throttle 65 is in full open position and the valves are in closed position and supercharging is taking place, if now it is desired to throttle the engine down, the supercharger pressure should also be decreased to a value below the predetermined pressure. This is readily accomplished by the control lever 64 to turn the valve 38 in a clockwise direction for opening the same and permit the escapement of the fluid pressure while simultaneously actuating the throttle to partially or totally close it.

The operation of my invention as applied to the system illustrated in Fig. 2 is as follows: As in the case above the regulator is adjusted for any predetermined pressure, the valve 36 however, is in closed position and throughout the operation of the regulator is not disturbed. In this instance the throttle 86 is normally in closed position while the three-way valve 38, which is simultaneously actuated with the throttle, is in the open position, as shown in Fig. 3. With this arrangement it is readily obvious that the throttle is manually controlled by the control 94 in the cock-pit through floating link arrangement up to the time when the valve 38 is moved to closed position. Automatic control of the throttle to limit the supercharging then takes place in a manner substantially as above described.

I claim,

1. In combination, an internal combustion engine having a throttle valve, a supercharger for supplying compressed air thereto, and means for limiting the degree of supercharging obtainable with said supercharger in accordance with a predetermined pressure, and manual means operable independent of said limiting means for reducing the supercharging and closing the throttle, and a second manual control for rendering the limiting means inoperative when the throttle is open.

2. The combination with an internal combustion engine, a supercharger supplying air to the engine, and means for controlling the supercharger of operating means for said controlling means, comprising a hydraulic servomotor, manual means for controlling both said servomotor and the supercharger, and means responsive to the supercharger pressure for controlling said motor after a predetermined degree of supercharging is obtained.

3. The combination with an internal combustion engine, a supercharger supplying air to the engine, and means for controlling the supercharger of operating means for said controlling means, comprising a hydraulic servomotor to actuate said controlling means, manual means for simultaneously controlling said supercharger controlling means and said servomotor, and means responsive to the supercharger pressure for controlling said motor after a predetermined degree of supercharging is obtained.

4. In combination with an internal combustion engine having a fuel conduit, a throttle therein, a barometrically regulated supercharger, a servomotor for controlling the supercharger, manually operable means for concurrently controlling the throttle and supercharger and a second manually operable means for controlling the servomotor independently of the throttle.

5. In combination with an internal combustion engine having a fuel conduit, a throttle therein, a supercharger, a servomotor for controlling the supercharger, means for simultaneusly reducing the speed of the supercharger and closing the throttle, and means for concurrently controlling the servomotor and the supercharger.

6. In combination with an internal combustion engine having a manifold, a supercharger therefor, means for controlling the supercharger in accordance with the manifold pressure, manual control means for the supercharger, said manual and pressure control means including a link pivotally connected to each control, said link being operable by either control independently of the other control and also being operable by the joint action of both controls.

7. In combination with an internal combustion engine having a manifold, an exhaust driven supercharger, means including a valve for controlling the exhaust, means for controlling the valve in accordance with manifold pressure, manual means for controlling the valve, said manual and pressure control means including a link pivotally connected to each control, said link being operable by either control independently of the position of the other control and also being operable by the joint action of both controls.

8. In combination with an internal combustion engine having a manifold, a supercharger therefor, means for controlling the supercharger, means responsive to manifold pressure for actuating the controlling means, manual means for actuating the controlling means, and a single linkage connecting both of said actuating means to the controlling means.

9. In combination with an internal combustion engine having a manifold, an exhaust driven supercharger therefor, a valve controlling the flow of exhaust gas to the supercharger, means responsive to manifold pressure for actuating the valve, manual means for actuating the valve, and a single linkage connecting both of said actuating means to the valve.

10. In combination with an internal combustion engine having a manifold, a supercharger therefor, means for controlling the supercharger, a servomotor, means responsive to manifold pressure for actuating the servomotor, manual means for actuating the controlling means, and a single linkage connecting both the servomotor and the manual actuating means to the controlling means.

11. In combination with an internal combustion engine having a manifold, a gas driven supercharger therefor, a valve controlling the flow of gas to the supercharger, a servomotor, means responsive to manifold pressure for actuating the servomotor, manual means for actuating the valve, and a single linkage connecting both the servomotor and the manual actuating means to the valve.

12. In combination with an internal combustion engine having a manifold, a supercharger therefor, means for controlling the supercharger, a fluid operated servomotor for actuating the controlling means, manual actuating means for the controlling means, a single linkage connecting the servomotor and the manual actuating means to the controlling means, and said manual means being arranged to control the supply of fluid to the servomotor and to operate the control means by a continuous movement of the manual means.

13. In combination with an internal combustion engine having a manifold, a gas driven supercharger therefor, a valve controlling the flow of gas to the supercharger, a fluid operated servomotor for actuating the valve, manual actuating means for the valve, a single linkage connecting the servomotor and the manual actuating means to the valve, and said manual means being arranged to control the supply of fluid to the servomotor and to operate the valve by a continuous movement of the manual means.

14. In combination with an internal combustion engine having an inlet conduit, a throttle therein, a supercharger, a servomotor for controlling the supercharger, means for controlling the servomotor in accordance with the differential between the pressure within the conduit and a predetermined pressure, manual means for concurrently controlling the servomotor and the throttle, and means for concurrently controlling the servomotor and the supercharger.

15. The combination with an internal combustion engine, a supercharger supplying air to the engine, means for controlling the supercharger of operating means for said controlling means, comprising a servomotor, manual means for controlling both said servomotor and the supercharger, and means responsive to the supercharger pressure for controlling said motor after a predetermined degree of supercharging is obtained.

ADOLPH L. BERGER.